(12) United States Patent
Henkinet et al.

(10) Patent No.: US 8,648,899 B2
(45) Date of Patent: Feb. 11, 2014

(54) LIQUID CRYSTAL LENSES HAVING ATTENUATED SWITCHING NOISE

(75) Inventors: Thierry Henkinet, Paris (FR); Bertrand Caillaud, St Laurent du Var (FR)

(73) Assignee: Volfoni R&D, Boulogne Billancourt (FR)

( * ) Notice: Subject to any disclaimer, the term of this patent is extended or adjusted under 35 U.S.C. 154(b) by 0 days.

(21) Appl. No.: 13/500,987

(22) PCT Filed: Oct. 7, 2010

(86) PCT No.: PCT/EP2010/065026
§ 371 (c)(1),
(2), (4) Date: Apr. 9, 2012

(87) PCT Pub. No.: WO2011/042505
PCT Pub. Date: Apr. 14, 2011

(65) Prior Publication Data
US 2012/0200790 A1    Aug. 9, 2012

(30) Foreign Application Priority Data

Oct. 9, 2009    (FR) ...................................... 09 04834

(51) Int. Cl.
*H04N 13/04* (2006.01)
*G02F 1/1335* (2006.01)

(52) U.S. Cl.
USPC ............................................. 348/56; 349/13

(58) Field of Classification Search
USPC ...................... 348/56; 349/13, 14, 33, 96, 99; 252/299.01
See application file for complete search history.

(56) References Cited

U.S. PATENT DOCUMENTS

| | | | | |
|---|---|---|---|---|
| 5,074,647 A | * | 12/1991 | Fergason et al. | 349/14 |
| 6,833,887 B1 | * | 12/2004 | Kaneko et al. | 349/99 |
| 7,002,643 B2 | * | 2/2006 | Kaneko et al. | 349/33 |
| 7,837,897 B2 | * | 11/2010 | Zhang et al. | 252/299.01 |
| 2006/0164569 A1 | * | 7/2006 | Sobek et al. | 349/96 |
| 2007/0242015 A1 | | 10/2007 | Anderson et al. | |

FOREIGN PATENT DOCUMENTS

| | | |
|---|---|---|
| EP | 1 280 361 | 1/2003 |
| GB | 2 314 169 | 12/1997 |
| JP | 2007-110683 | 4/2007 |

\* cited by examiner

*Primary Examiner* — Gims Philippe
(74) *Attorney, Agent, or Firm* — Occhiuti & Rohlicek LLP

(57) ABSTRACT

The invention relates to liquid crystal lenses having dynamically switchable light transmission, including: a shutter (2) including two transparent substrates (21, 22) and a nematic liquid crystal layer (20) arranged between the substrates (21, 22); and a control circuit capable of alternately applying a bias voltage or a relaxation voltage across the liquid crystal to render the shutter (2)clear or opaque, the falling edges between the bias voltage and the relaxation voltage having a duration of 80 to 900 µs.

10 Claims, 2 Drawing Sheets

LIQUID CRYSTAL LENSES HAVING ATTENUATED SWITCHING NOISE

CROSS-REFERENCE TO RELATED APPLICATIONS

This application is the National Stage of International Application No. PCT/EP2010/065026, filed on Oct. 7, 2010, which claims the benefit of the priority date of French Application No. 0904834, filed on Oct. 9, 2009. The content of these applications is hereby incorporated by reference in its entirety.

The invention relates to liquid-crystal glasses and in particular to liquid-crystal glasses having lenses that are made alternately clear and opaque.

Liquid-crystal glasses with dynamic alternation between a transparent state and an opaque state are known. Such glasses are known in particular in the field of three-dimensional stereoscopic vision or in the field of encrypted displays.

Such glasses are used especially in the field of displaying digital contents in three dimensions, for example in cinema halls. Such glasses comprise a shutter for each eye, each shutter comprising a liquid-crystal cell. A liquid-crystal cell is provided with two substrates placed opposite each other and generally made of a rigid transparent material such as glass. The substrates comprise a polarizer and an analyzer respectively, these being crossed, and a liquid crystal is placed between the two substrates. The liquid crystals are materials whose optical properties, and in particular the birefringence, can be modified by applying an electric field thereto. The electric field is generated by means of a control voltage applied between the substrates by thin transparent electrodes. As is known per se, the liquid crystal makes it possible selectively for light polarized by the polarizer to pass through or not (or practically not) pass through the analyzer, thus forming a voltage-controlled optical shutter.

The projection of stereoscopic images currently uses the alternated projection of two video sequences taken at different viewing angles. A first video sequence is thus intended for the left eye and a second video sequence is intended for the right eye, thus creating an impression of relief. Since the sampling frequency imposed by the cinema standard for a video sequence is greater than 48 Hz (in order for the rate of progression of the images not to be perceptible to the eye), the frequency of projection onto a cinema screen is at least 96 hertz as each eye must see only the sequence which is intended therefore. Consequently, the switching frequency of the shutter for one eye is also at least equal to 48 Hz. Certain standards impose a projection frequency of 144 hertz i.e. a switching frequency of 72 Hz.

In general, an infrared emitter is placed in a cinema hall. The infrared emitter sends a specific sync signal for synchronizing the glasses with the video sequences of the projector. The glasses include an electronic circuit that detects the sync signal and generates a shutter address signal. The shutter address signal serves for switching the liquid-crystal cells in sync with the video sequences projected onto the screen of the cinema hall.

To improve the quality of the images perceived with the glasses, three main criteria are to be taken into account. A first criterion relates to the response time of the liquid crystal (the time to switch to the opaque state and the time to switch to the transparent state) which must be relatively short. To comply with this criterion it is generally necessary to choose a smectic liquid crystal having a short relaxation time and to apply address signals having sharp edges. A second criterion is the level of transparency of the transparent state, which must let through a maximum amount of light while respecting optimum projected colors. A third criterion relates to the level of opacity of the opaque state, which must be high enough to make the sequence intended for the other eye imperceptible.

With the glasses placed on the wearer's face, it is also important to limit the weight and size of the glasses. Consequently, the glass substrates of the cell generally have a relatively small thickness of between 0.5 and 1 mm. With a smectic liquid crystal, it is also possible to limit the liquid crystal thickness between the substrates to about 1 to 2 µm.

However, such glasses have drawbacks. This is because the amplitude of the electric fields generated and the switching frequency of the glasses induce vibrations, causing noise in the audible range. When the glasses are placed on the wearer's face, this noise is close to the auditory member and therefore particularly annoying when viewing the film. The amplitude of the noise is higher the lower the weight of the substrate glass. Therefore, lightening such glasses is limited by the appearance of these noise problems.

Such problems appear in particular in the liquid-crystal glasses described in the document JP2007-110683. That document describes in particular a closure period during which both shutters are made opaque simultaneously.

The aim of the invention is to solve one or more of these drawbacks. The invention thus relates to liquid-crystal glasses having dynamically switchable light transmission, comprising:
 a shutter including two transparent substrates and a layer of nematic liquid crystal placed between the substrates; and
 a control circuit capable of alternately applying a bias voltage and a relaxation voltage across the liquid crystal in order to make the shutter go clear or opaque, the voltage falling edges, between the bias voltage and the relaxation voltage, having a duration of between 80 and 900 µs.

According to one embodiment, the falling edges between the bias voltage and the relaxation voltage have a duration of between 200 and 700 µs, preferably between 300 and 600 µs.

Again according to one embodiment, the glasses comprise an interface for receiving a sync signal, the control circuit switching between the bias voltage and the relaxation voltage at a frequency equal to the frequency of the sync signal received.

According to another embodiment, the falling edges have a slope of less than 250 kV/s.

Again according to another embodiment, the voltage rising edges, between the relaxation voltage and the bias voltage, have a duration of between 200 and 2000 µs.

According to one embodiment, the rising edges have a slope of less than 50 kV/s.

Again according to one embodiment, the layer of liquid crystal has a thickness of less than 3 µm.

According to another variant, one of the transparent substrates has a thickness of less than 500 µm.

The invention also relates to a method of switching a shutter for nematic liquid-crystal glasses, which includes a step of alternately applying a bias voltage and a relaxation voltage across the liquid crystal in order to make the shutter go clear or opaque, the falling edges between the bias voltage and the relaxation voltage having a duration of between 80 and 900 µs.

According to one embodiment, the frequency of the falling edges of the shutter is greater than 48 Hz.

Other features and advantages of the invention will become clearly apparent from the description given below by way of entirely nonlimiting indication, with reference to the appended drawings in which.

The invention proposes liquid-crystal glasses having dynamically switchable light transmission. The glasses comprise two shutters provided with a layer of nematic liquid crystal in order to make these shutters go selectively clear or opaque. The glasses moreover have a control circuit that applies a bias voltage and a relaxation voltage across the liquid crystal alternately in order to make the shutter go clear or opaque. The falling edges between the bias voltage and the relaxation voltage have a duration of between 80 and 900 µs.

The use of such control signals makes it possible, surprisingly, for the noise generated by the glasses during switching to be significantly reduced. In addition, the use of nematic liquid crystal enables bias voltages of a moderate level to be used. Thus, the amplitude of the noise generated is reduced. Moreover, despite the use of nematic liquid crystal and a long falling edge duration, the perceived image quality does not suffer substantially.

Surprisingly, a noise reduction is thus obtained by acting on the control voltage during the liquid-crystal relaxation phase, whereas it was commonly accepted that little noise was generated during this phase since the relaxation time of the liquid crystal (essentially defined by the intrinsic properties and the thickness thereof) was relatively long compared to its excitation time.

Such a falling edge duration makes it possible to limit the variation in forces applied on the substrates and also enables the speed of movements within the liquid crystal to be reduced.

Figure 1:
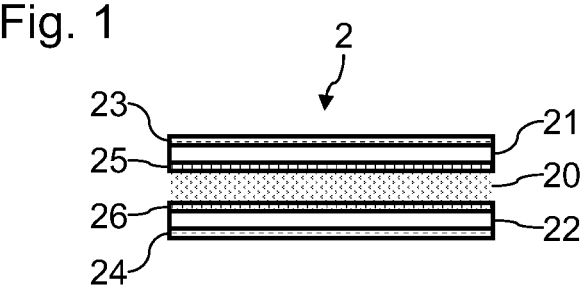
FIG. 1 is a schematic sectional view of a liquid-crystal glasses shutter.

FIG. 1 is a schematic sectional view of a shutter 2 intended to be mounted in glasses according to the invention. The shutter 2 comprises two glass substrates 21 and 22 facing each other. A polarization film 23, called an analyzer, is placed on a first side of the substrate 21. A transparent control electrode 25 is placed on a second side of the substrate 21, within the volume defined between the substrates 21 and 22. A polarization film 24, called a polarizer, is placed on a first side of the substrate 22. A transparent control electrode 26 is placed on a second side of the substrate 22, within the volume defined between the substrates 21 and 22. In this example, the polarization of the film 23 is perpendicular to the polarization of the film 24. A nematic liquid crystal 20 is placed in the volume defined between the substrates 21 and 22. This liquid crystal may have a viscosity of 13.6 cP, an index $n_o$ of 1.5133, an index $n_e$ of 1.6932, a birefringence $\Delta n(=n_o-ne)$ of 0.1799 and a temperature range of the nematic phase from −20° C. to 83.9° C.

Orientation films (not illustrated) may be placed between the control electrodes 25 and 26 and the liquid crystal. Such orientation films may for example have a rubbing direction intended to favor certain regions for viewing through the shutter 2. For example, it is possible to use films of which the rubbing orientation is antiparallel so as to reduce the twist of the liquid crystal 20.

Figure 2:
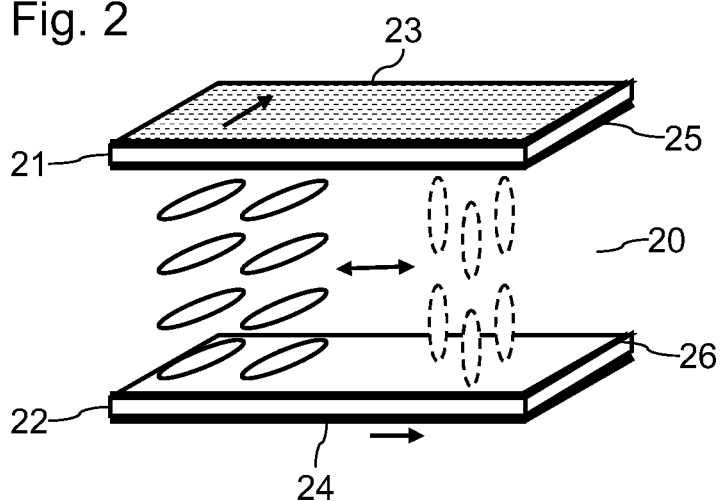
FIG. 2 is a schematic perspective view of the shutter.

FIG. 2 shows schematically the orientation of the liquid crystal in two polarization states induced by the control electrodes 25 and 26. In the example illustrated with reference to FIG. 2, the shutter 2 is in the clear state when the liquid crystal 20 is at rest, when no electric field is applied by means of the control electrodes 25 and 26. When the shutter 2 is in the clear state, the light having passed through the polarizer 24, the liquid crystal 20 has the same polarization as the analyzer 23. The shutter 2 is opaque when the liquid crystal 20 is excited by means of the control electrodes 25 and 26, a bias voltage +V or −V being applied therebetween. When the shutter 2 is in the opaque state, the light having passed through the polarizer 24, the liquid crystal 20 has a polarization perpendicular to that of the analyzer 23.

The shutter 2 is advantageously designed to be clear when the liquid crystal 20 is at rest. The quality of the clear and opaque states obtained is thus optimized. A person skilled in the art may of course also design the shutter 2 to be opaque when the liquid crystal 20 is at rest.

Figure 3:
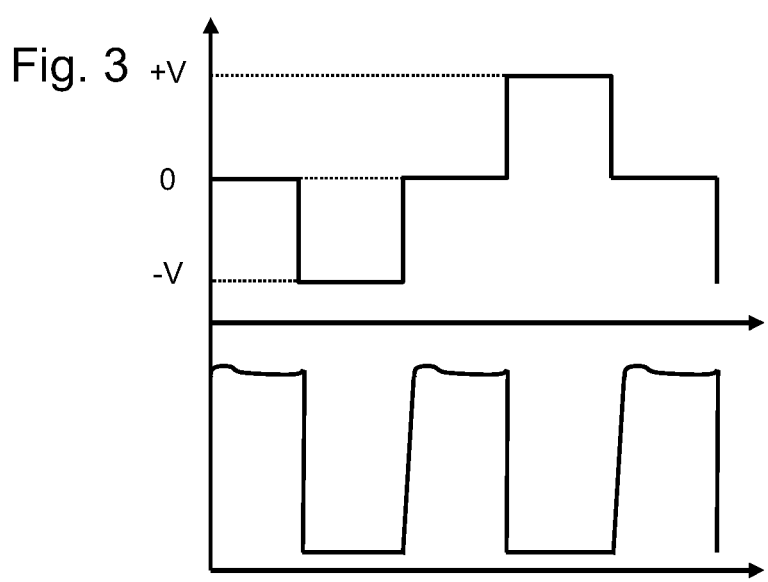
FIG. 3 is a timing diagram for a control signal and for the response of a liquid-crystal shutter according to the prior art.

FIG. 3 is a timing diagram showing, at the top, the level of the voltage applied between the electrodes 25 and 26 and, at the bottom, the level of transmission of the shutter 2. The control voltage illustrated corresponds to a profile according to the prior art, in which the rising edges and the falling edges are virtually instantaneous. The level of transmission of the shutter 2 is high (clear state) when the voltage between the electrodes 25 and 26 is zero. The level of transmission of the shutter 2 is very low (opaque state) when the voltage between the electrodes 25 and 26 is +V or −V.

To avoid damaging the nematic liquid crystal 20 by charge migration, the average voltage applied between the electrodes 25 and 26 must be substantially zero. Consequently, pulses of voltage +V are alternated with pulses of voltage −V. The +V voltage and the −V voltage both correspond to an opaque state. The pulses of +V and −V voltage (pulses of amplitude V) are separated by periods at zero voltage, preventing the application of a field on the liquid crystal, that is to say the application of a relaxation voltage. In certain applications, it is also conceivable for the relaxation voltage not to be strictly zero. The periods of the pulses and the periods of zero excitation are substantially identical. The liquid crystal 20 undergoes relaxation during a falling edge of the voltage applied by the control electrodes 25 and 26, by passing from excitation by a +V or −V voltage to a zero excitation. The voltage level V may advantageously be between 1 and 30 V, and may for example be around 15 V.

Figure 4:
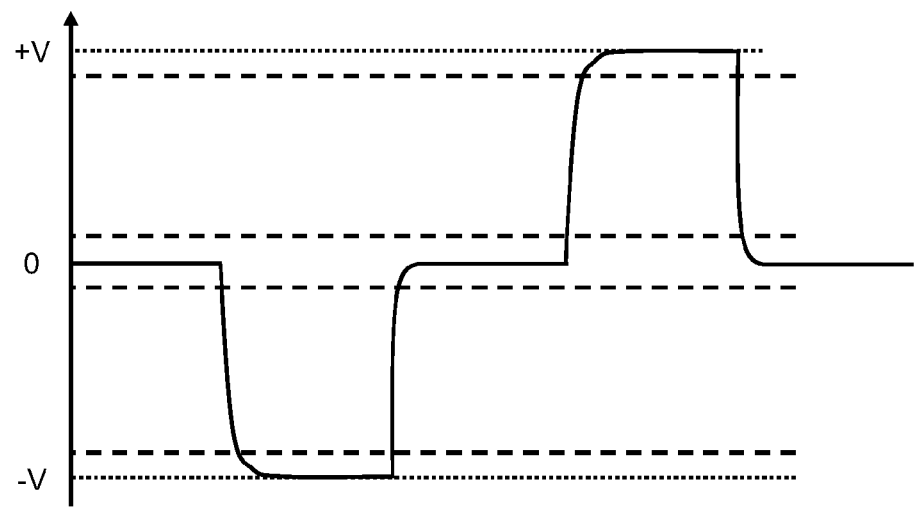
FIG. 4 is a timing diagram for a control signal of a shutter according to an implementation example of the invention.

FIG. 4 shows schematically an example of a control voltage profile applied between the control electrodes 25 and 26 according to an implementation example of the invention. As in the example shown in FIG. 3, the opaque state of the shutter 2 is defined either by pulses of voltage +V or by pulses of voltage −V. The clear state of the shutter 2 is defined by a zero relaxation voltage. During a rising edge, the voltage passes from the zero relaxation voltage to a bias voltage, either +V or −V. During a falling edge, the voltage passes from a bias voltage, either +V or −V, to the zero relaxation voltage.

The duration of the rising edge of a pulse will be defined hereafter as the time to pass from 10% of V to 90% of V. The duration of the falling edge of a pulse will be defined as the time to pass from 90% of V to 10% of V.

According to the invention, a falling edge duration of between 80 and 900 µs is used. This duration will preferably be longer than 200 µs and advantageously longer than 300 µs. Such durations make it possible for the noise generated by the shutter 2 during its operation to be substantially limited. This duration will be preferably shorter than 700 µs and advantageously shorter the 600 µs. Such durations make it possible to minimize the degradation in image quality when switching to the transparent state. Moreover, such durations remain compatible with the switching frequencies required for stereoscopic viewing.

The duration of the falling edge will advantageously be adapted to the level of the voltage V. The higher the voltage level V, the longer the duration of the falling edge, so as to reduce the noise generated by the shutter 2. To reduce the noise generated by the switching of the shutter 2, the slope of the falling edge is advantageously less than 250 kV/s.

Advantageously, the noise may also be reduced by varying the duration of the rising edge of a pulse. The duration of the rising edge is advantageously between 200 and 2000 µs. This duration will be preferably longer than 300 µs and advantageously longer than 400 µs. This duration will be preferably shorter than 1500 µs, and advantageously shorter than 1000 µs, so as to obtain relatively rapid switching to the opaque state of the shutter 2. To reduce the noise generated by the switching of the shutter 2 as a function of the voltage level V, it will be advantageous to use a rising edge slope of less than 50 kV/s.

A shutter 2 provided with thin substrates 21 and 22 is particularly propitious for generating noise during switching, the amplitude of the vibrations of a substrate being higher the smaller the thickness. The invention therefore proves to be particularly appropriate for a shutter 2 provided with at least one substrate having a thickness of less than 700 µm and more particularly less than 500 µm.

Advantageously, the thickness of the layer of liquid crystal is relatively small (for example between 0.8 et 3 µm, and preferably between 1 and 2 µm) so as to reduce the relaxation time of the liquid crystal, denoted by $\tau_{on}$, and thus the response time of the liquid crystal. During relaxation, the liquid crystal is no longer exposed to external forces and its intrinsic properties and the dimensions of the shutter 2 determine the relaxation time.

This is illustrated by the following formula:

$$\tau_{on} \approx v\, d^2/K\pi^2,$$

where d is the thickness of the liquid crystal 20, v is its viscosity and K is its elastic constant.

Moreover, by having a relatively small thickness of the layer of liquid crystal 20 it is possible to increase the field generated by a voltage pulse in the opaque state.

The liquid crystal 20 has birefringence properties appropriate to its thickness, in order to optimize the transmission spectrum so that it is approximately centered with respect to the eye's response, i.e. approximately at a wavelength of 550 nm.

The time to pass from the clear state to the opaque state is relatively short, as it is imposed by the field generated by a voltage pulse. The higher the level of voltage V of a pulse, the higher the level of opacity of the opaque state, this being a desirable characteristic for the glasses. However, most of the sound generated by the switching of the shutter 2 comes from the electrostatic forces generated in the liquid crystal.

To a first approximation, a shutter 2 can be likened to a capacitor. Thus, the application of an electric field in a capacitor results in an accumulation of energy that corresponds to the work provided for charging the capacitor. If this is considered to have a capacitance C, carrying a charge +q on one plate and −q on the other plate, to move an infinitesimal charge +q from one plate to the other with a potential difference V=q/C, it is necessary to provide a work δW given by:

$$\delta W = q/C\, \delta q$$

where W is the work measured in joules, q is the charge measured in coulombs and C is the capacitance measured in farads.

The energy stored in the capacitor may then be calculated by integrating this equation. Starting with an uncharged capacitor (q=0) and moving the charges from one plate to the other until having a charge +Q on one plate and a charge −Q on the other plate, the amount of work W that has to be provided is given by:

$$W = \tfrac{1}{2}CV^2 = \tfrac{1}{2}(\epsilon_0 \epsilon_r S/d)V^2.$$

In this formula, V is the control voltage applied across the terminals of the cell, S is the area and d the thickness of the layer of liquid crystal (d corresponding to the gap between the plates of the capacitor), and $\epsilon_o$ and $\epsilon_r$ are the permittivity of free space and the permittivity of the material respectively.

Stemming from this work is in an electrostatic force F which, if it is considered that the voltage level V is constant, is defined as follows:

$$F = \delta W/\delta d = \tfrac{1}{2}V^2 \epsilon_o \epsilon_r S\, \delta(1/d)/\delta d = -V^2 \epsilon_o \epsilon_r S/2d^2.$$

The amplitude of this force decreases proportionally to the square of the thickness d of the liquid-crystal layer. Thus, the invention proves to be particularly appropriate when it is applied to shutters having a small liquid-crystal thickness, in such shutters being the amplitude of the noise potentially generated is much higher. The invention proves to be particularly appropriate for maintaining a good quality of opacity, while avoiding having to reduce the amplitude of the voltage V in order to reduce the noise generated.

Figure 5:
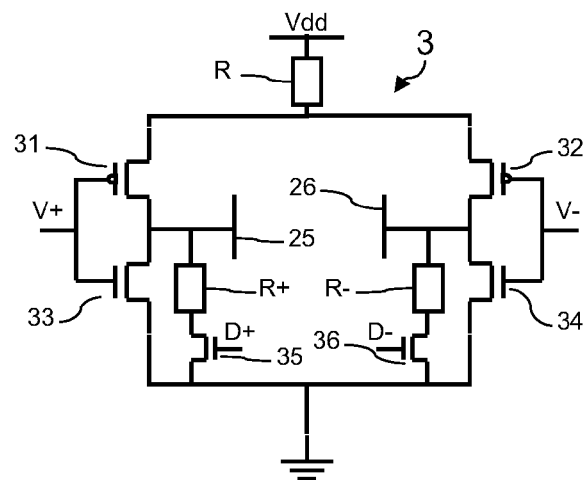
FIG. 5 is a circuit diagram for an example of a control circuit for implementing the invention.

FIG. 5 is a circuit diagram for an example of a control circuit 3 intended for implementing the invention. The control circuit 3 comprises an interface for receiving a sync signal (not illustrated). This receiving interface is for example an interface for receiving an infrared signal or a radio frequency signal. The sync signal defines what shutter has to be turned clear and at what moment. The receiving interface converts the sync signal into control signals V+, V−, D+ and D− that are used in the control circuit 3.

The control circuit 3 comprises pMOS transistors 31 and 32 and nMOS transistors 32 to 36. The transistors 31 and 33 are connected in series between a potential Vdd and ground potential. The signal V+ is applied to the gate of the transistors 31 and 33. The control electrode 25 is connected to the junction between the transistors 31 and 33. The transistor 35 is connected in series with a resistor R+. The resistor R+ is connected to the control electrode 25. A control signal D+ is applied to the gate of the transistor 35. The transistors 32 and 34 are connected in series between a potential Vdd and ground potential. The signal V− is applied to the gate of the transistors 32 and 34. The control electrode 26 is connected to the junction between the transistors 32 and 34. The transistor 36 is connected in series with a resistor R−. The resistor R− is connected to the control electrode 26. A control signal D− is applied to the gate of the transistor 36. A resistor R is connected in series between the transistors 31 and 32 and the potential Vdd.

In the clear state of the shutter 2 associated with the control circuit 3, a zero voltage is applied between the electrodes 25 and 26. The control signals V+ and V− are in the high state in order to turn on the transistors 33 and 34 and to turn off the transistors 31 and 32. The same ground voltage is applied to the control electrodes 25 and 26. The control signals D+ and D− are in the high state, so that the transistors 35 and 36 are turned on.

In the opaque state of the shutter 2 associated with the control circuit 3, a control voltage of +V or −V is maintained between the electrodes 25 and 26. In a first case, the control signal V+ is in the high state and the control signal V− is in the low state. The transistors 31 and 34 are therefore in the off-state and the transistors 32 and 33 are in the on-state. The voltage Vdd is applied to the electrode 26 and ground voltage is applied to the electrode 25. The control signals D+ and D− are in the low state in order to turn off the transistors 35 and 36. In a second case, the control signal V− is in the high state and the control signal V+ is in the low state. The transistors 32 and 33 are therefore in the off-state and the transistors 31 and 34 are in the on-state. The voltage Vdd is applied to the electrode 25 and ground voltage is applied to the electrode 26. The control signals D+ and D− are in a low state in order to turn off the transistors 35 and 36.

The control signals V+ and V− in the high state and the signals D+ and D− in the high state are applied during a falling edge. In the first case, the internal capacitor of capacitance C (for example between 10 and 60 nF) formed by the shutter 2 combined with the resistor of resistance R− forms a series circuit having a discharge time constant defined by the value C*R−. This time constant defines the duration of the falling edge in this first case. In the second case, the internal capacitor of capacitance C formed by the shutter 2 combined with the resistor of resistance R+ forms a series circuit having a discharge time constant defined by the value C*R+. This time constant defines the duration of the falling edge in this second case.

During a rising edge, the resistor R defines the time constant and thus the duration of this rising edge.

The durations of the rising and falling edges may cause a delay in addressing the shutters 2. To alleviate this drawback, it may be advantageous to advance the sync signals by a certain amount in order to take this delay into account.

Independently, the invention also relates to the duration of the rising edge between the relaxation voltage and the bias voltage, according to the teaching explained in detail above.

The invention claimed is:

1. An apparatus for viewing projected moving images, said apparatus comprising liquid crystal glasses having dynamically switchable light transmission, said apparatus comprising a shutter having two transparent substrates and a layer of nematic liquid-crystal disposed between said two transparent substrates, and a control circuit configured to alternately apply a bias voltage and a relaxation voltage across said nematic liquid-crystal thereby causing said shutter to transition between a clear state and an opaque state, said voltage having voltage falling edges between said bias voltage and said relaxation voltage, said voltage falling edges having a duration of between 80 microseconds and 900 microseconds, said apparatus further comprising an interface for receiving a sync signal, said sync signal having a sync-signal frequency, and wherein said control circuit is configured to switch between said bias voltage and said relaxation voltage at a frequency equal to said sync-signal frequency.

2. The apparatus of claim 1, wherein said voltage falling edges between said bias voltage and said relaxation voltage have a duration of between 200 microseconds and 700 microseconds.

3. The apparatus of claim 1, wherein said voltage falling edges between said bias voltage and said relaxation voltage have a duration of between 300 microseconds and 600 microseconds.

4. The apparatus of claim 1, wherein said falling edges have a slope of less than 250 kilovolts per second in magnitude.

5. The apparatus of claim 1, wherein voltage rising edges between said relaxation voltage and said bias voltage have a duration between 200 microseconds and 2,000 microseconds.

6. The apparatus of claim 5, wherein said voltage rising edges have a slope of less than 50 kilovolts per second.

7. The apparatus of claim 1, wherein said nematic liquid-crystal has a thickness of less than 3 micrometers.

8. The apparatus of claim 1, wherein at least one of said transparent substrates has a thickness of less than 500 micrometers.

9. A method of enabling a viewer to view projected moving images, said method comprising receiving a sync signal having a sync-signal frequency, and switching a shutter for nematic liquid-crystal glasses, wherein switching a shutter comprises alternately applying a bias voltage and a relaxation voltage across said nematic liquid-crystal at a frequency equal to said sync-signal frequency to cause said shutter to transition between a clear state and an opaque state at said sync-signal frequency, said voltage having falling edges having a duration between 80 microseconds and 900 microseconds.

10. The method of claim 9, wherein a frequency of said falling edges is greater than 48 Hz.

* * * * *